United States Patent [19]

Koenig et al.

[11] Patent Number: 4,839,643

[45] Date of Patent: Jun. 13, 1989

[54] BROADBAND SIGNAL SWITCHING EQUIPMENT

[75] Inventors: Wilhelm Koenig, Munich; Thomas Lang, Taufkirchen; Gerhard Trumpp, Puchheim, all of Fed. Rep. of Germany

[73] Assignee: Siemens Aktiengesellschaft, Berlin and Munich, Fed. Rep. of Germany

[21] Appl. No.: 62,678

[22] Filed: Jun. 16, 1987

[30] Foreign Application Priority Data

Jun. 19, 1986 [DE] Fed. Rep. of Germany ....... 3620507

[51] Int. Cl.$^4$ .............................................. H04Q 9/00
[52] U.S. Cl. ........................... 340/825.91; 340/825.89; 379/292; 307/241; 307/530
[58] Field of Search ............... 340/825.85–825.93, 340/825.79; 379/291, 292, 54, 94; 370/58; 307/530, 350, 352–354, 358–359, 362–363, 279, 241, 290–291, 468–469; 328/162, 151; 330/306

[56] References Cited

U.S. PATENT DOCUMENTS

| | | | |
|---|---|---|---|
| 3,718,864 | 2/1973 | Kelly et al. | 307/290 |
| 3,980,831 | 9/1976 | Mertel . | |
| 3,983,049 | 2/1976 | Acker et al. | 328/162 |
| 4,287,441 | 9/1981 | Smith | 307/353 |
| 4,434,381 | 2/1984 | Stewart . | |
| 4,571,514 | 2/1986 | Nelson et al. | 307/353 |
| 4,588,905 | 5/1986 | Kojima | 307/358 |
| 4,745,409 | 5/1988 | Hofmann | 340/825.87 |
| 4,746,921 | 5/1988 | Hofmann | 340/825.87 |
| 4,785,299 | 11/1988 | Trumpp | 340/825.89 |

FOREIGN PATENT DOCUMENTS 2365263 9/1976 France .

OTHER PUBLICATIONS

"Arbeitsgeschwindigkeitsgrenzen von Koppelnetzwerken fuer Breitband-Digitalsignale", DISS., Braunschweig, 1978, FIGS. 6.1–6.7.
"Switching Matrix Delivers 100 Mb/s", Electronics, Dec. 15, 1983, pp. 88–89.
Sanazawa et al., "Wideband Integrated Crosspoint Switch Matrix", Review of the Electrical Communication Laboratories, vol. 25, No. 1–2, pp. 43–51, Jan.–Feb., 1977.

Primary Examiner—John W. Caldwell, Sr.
Assistant Examiner—Edwin C. Holloway, III
Attorney, Agent, or Firm—Hill, Van Santen, Steadman & Simpson

[57] ABSTRACT

Switches having a relatively high forward resistance are provided in a broadband signal switching equipment comprising a crosspoint matrix constructed in field effect transistor technology and provided with input drivers and output amplifiers. The output amplifiers respectively comprise an iterative network of a hysteresis-affected comparator and a D flip-flop, as well as a holding memory and a switch by way of which the holding memory is reloaded in a respective primary phase of a bit switching time interval. The reloading occurs at least approximately to the potential momentarily prevailing on the output line section leading away from the switch, this potential then continuing to be maintained at the second comparator input in the following switching phase.

3 Claims, 2 Drawing Sheets

BROADBAND SIGNAL SWITCHING EQUIPMENT

BACKGROUND OF THE INVENTION

Recent developments in telecommunications technology have led to service-integrated communications transmission and switching systems for narrow band and broadband communication services which provide light waveguides as the transmission medium in the region of the subscriber lines by way of which both the narrow band communications services such as, in particular, 64 kbit/s digital telephony, and broadband communications services such as, in particular, 140 Mbit/s picture telephony, are conducted, whereby, however, dedicated narrow band signal switching equipment and broadband signal switching equipment are provided in the exchanges preferably comprising shared control devices, such as in the U.S. Pat. No. 3980 831 (German Pat. No. 24 21 002), fully incorporated herein by this reference.

In conjuction with the broadband signal time-division multiplex switching equipment whose crosspoints are utilized in time-division multiplex for a respective plurality of connections, it is known to connect, respectively, two lines with the assistance of a gate circuit which is switched on and off by a crosspoint-associated memory cell constructed as a bistable D flip-flop, whereby this cross-point associated memory cell, whose clock input is supplied with a corresponding clock signal, is driven in only one coordinate direction, namely at its D input. In this connection one may take reference to Pfannschmidt: "Arbeitsgeschwindigkeitsgrenzen von Koppelentzwerken fuer Breitband-Digitalsignale", Diss., Braunschweig, 1978, FIG. 6.7 and FIG. 6.4. In view of a time-division multiplex factor of about 4–8, which can be achieved in view of a bit rate of 140 Mbits/s and in view of the involved circuit technology thereby required, however, exclusive space-division switching facilities are presently preferred for switching broadband signals, the connections by way of the individual crosspoints being separated from one another therein only on spatial basis.

An exclusive broadband signal space-division switching matrix network can be constructed as a crosspoint matrix in complementary-metal-ooxide-semiconductor (CMOS) technology, provided with input amplifiers and output amplifiers, in whose crosspoints the switching elements are respectively controlled by a decoder-controlled, crosspoint-associated holding memory cell, whereby the switch elements are respectively constructed as a CMOS transfer gate (CMOS transmission gate: ISS'84 Conference Papers 23 Cl, FIG. 9); the crosspoint-associated holding memory cells of an exclusive spaced-division switching matrix can be driven in two coordinates proceeding from a row decoder and from a column decoder, being respectively driven via a row-associated or, respectively, column-associated select line (Pfannschmidt, Op. Cit, FIG. 6.4). Output amplifiers provided in a switching matrix can be activated dependent on the activation of at least one crosspoint of the appertaining matrix line, as in the French Pat. No. 2,365,263, FIG. 5, fully incorporated herein by this reference.

It is likewise known in general form, from Electronics, Dec. 15, 1983, pp. 88–89, to provide digital crosspoints in the form of tristate inverters in a broadband crosspoint matrix, the specific realization of these tristate inverters being thereby unresolved but at least requiring a plurality of transistors.

A particularly low transistor expense in the specific realization of the individual crosspoints is comprised by a broadband signal space-division switching equipment, such as disclosed in the U.S. Ser. No. 013,069 (German No. 36 04 605.1), also fully incorporated herein by this reference, comprising a crosspoint matrix in field effect transistor (FET) technology whose switching elements are respectively controlled by a decorder-controlled, cross-point-associated memory cell in which the switch elements are respectively formed by a single n-channel transistor charged at its gate electrode with a switching potential which exceeds the upper limit value of a signal to be through-connected by more than the transistor pinch-off voltage or, respectively, is charged with an inhibit potential falling below the level derived by increasing the lower limit value of a signal to be through-connected by the transistor pinch-off voltage. Switch elements provided in a crosspoint matrix and respectively controlled in a simple manner by way of a crosspoint-associated holding memory cell can therefore be realized with minimum transistor expense, without inverters and without a p-channel transistor to be provided in a CMOS transfer gate which requires a larger area because of its higher specific resistance and, therefore, can be realized with a correspondingly low spaced requirement and with correspondingly low switch capacitances, this being particularly important in integration.

An additional reduction in the size of the circuit and, therefore, of the space requirement for such a crosspoint derives with a crosspoint-associated memory cell driven in two coordinate directions by two selection decoders (row decorder, column decoder), this memory cell being constructed with an n-channel transistor and two cross-coupled inverter circuits whose one's input is connected to the appertaining decoder output of the one selection decoder via the n-channel transistor which is, in turn, charged at its control electrode with the output signal of the appertaining decoder output of the other selection decoder and whose one's output leads to the control input of the appertaining switch element.

Arbitrarily, asynchronous signals having bit rates up to the order of magnitude of 170 Mbit/s and, therefore, in particular, what is referred to as a signal (for instance, a 140 Mbit/s signal) filling what is referred to as a H4-channel can be respectively through-connected between an input and an output (or, given distribution servies, a plurality of outputs) via such a proposed, broadband signal spaced-division switching equipment comprising a crosspoint matrix in FET technology having, for example, 64 inputs and 32 outputs. In the meantime, the requirement arises that not only should a respective, entire H4-channel be available to be switched but sub-channels, for example what are referred to as H3-channels, for example 34 Mbit/s signals, should also be capable of being switched. Such a sub-channel switching can be fundamentally achieved with the assistance of demultiplexers dividing the respective (H4-channels) into its (H3) sub-channels which precede the switching equipment and with the assistance of multiplexers which again combine the sub-channels to form a channel following the switching equipment, whereby the switching equipment itself respectively switches the individual sub-channels by themselves. This, however, assumes a corresponding multiplication of the inputs and outputs of the crosspoint matrix which, for example, must then comprise 256×128 crosspoints instead of merely 64×32 crosspoints in this example. The requirement for complete distribution service capability of the crosspoint matrix thereby raises the problem that each of the inputs (256 inputs in this example) of such a crosspoint matrix must be capable of being simultaneously loaded by all outputs (128 in this example) of the crosspoint matrix. This would require 256 input driver circuits per se of excessively-large size whose cross currents and dissipated power, however, would considerably complicate the feasibility of such a crosspoint matrix module.

SUMMARY OF THE INVENTION

In view of the foregoing, the object of the present invention is to provide a broadband signal switching equipment which is capable of doing justice to the requiements outlined above without involving such difficulties.

The present invention is directed to a broadband signal switching equipment comprising a crosspoint matrix constructed in FET technology at whose inputs a respective input driver circuit can be provided and whose outputs are respectively provided with an output amplifier circuit. This broadband signal switching equipment, according to the present invention, is particularly characterized in that the crosspoints are formed with switch elements comprising a high forward or, respectively, internal resistance in the through-connected condition when respectively compared to an internal resistance effective at a matrix input, and in that the output amplifier circuits respectively comprise an interative (recurrent) network of a comparator and of a storage element inserted into the appertaining output line and comprise a sample-and-hold circuit connecting the output line section leading from the appertaining switching elements to the one comparator input to the other comparator input. The sample and, hold circuit comprises a holding memory and a switch whose control electrode is charged with a switching matrix network switching clock sub-dividing a bit switching time interval into a preliminary phase and into the actual switching phase and by way of which circuit the holding memory is recharged in each preliminary phase at least approximately to the potential momentarily prevailing on the output line section, this potential then continuing to be maintained at the other comparator input in the following switching phase.

For the purpose of amplitude base correction in an opto-electric scanning device, it should be noted here that it is known from U.S. Pat. No. 3,938,049, particularly FIG. 11, fully incorporated herein by this reference, to supply the signal acquired in the scanning directly to the one input of a differential amplifier and to supply the same signal to the other input of the differential amplifier by way of a switch with a following holding capacitor, this switch being closed during a dark period and being opened shortly before the end thereof.

Problems with respect to an especially practical embodiment of a broadband signal switching equipment are thereby not touched upon; however, the present invention illustrates a manner to accomplish the same.

The present invention provides the advantage that even a small signal increase, not yet making any excessive requirements of the input driver circuits and their cross currents and dissipated powers, and a small recharging of the respective output line sections leading to the comparator input, which is thereby effected, suffices in order to effect and unambiguous change of the digital signal from the respective one signal state into the other signal state at the respective output of the comparator (hysteresis affected in a further development of the invention) and, therefore, on the output line section continuing therefrom.

In accordance with a further development and feature of the invention, the memory can be formed by a D flip-flop having its clock input charged with the switching matrix network switching clock.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
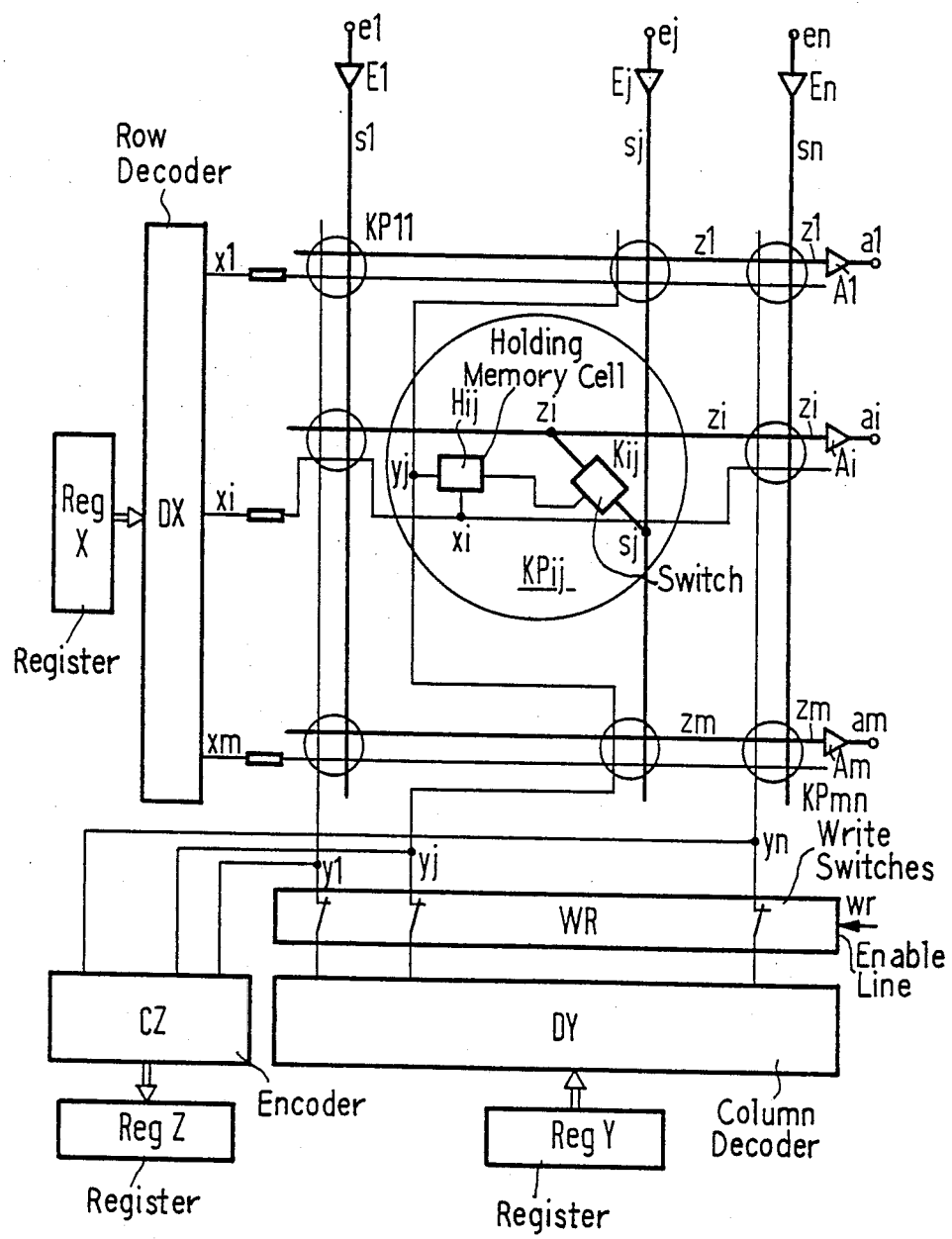
FIG. 1 is a schematic circuit digram of a broadband switching equipment comprising crosspoints.

Referring to FIG. 1, the drawing schematically illustrates a broadband signal switching equipment in a scope required for an understanding of the invention including input drivers, El ... Ej ... En at the inputs el ... ej ... en and leading to column lines $s1 \ldots sj \ldots sn$ of a crosspoint matrix and including outputs $a1 \ldots ai \ldots am$ connected to row lines $z1 \ldots zi \ldots zm$ of the crosspoint matrix by way of respective output amplifiers $A1 \ldots Ai \ldots An$. The crosspoint matrix comprises crosspoint $Kp11 \ldots KPij \ldots KPmn$ whose switches, as indicated in greater detail at the crosspoint $KPij$ for the switch $Kij$ thereof, are respectively controlled by a crosspoint-associated holding memory cell $Hij$ (at the crosspoint $KPij$) whose output leads to the control input of a respective switch ($Kij$ at the crosspoint $KPij$).

In accordance with FIG. 1, the holding memory cells $Hij$, for example, are selected in two coordinate directions by two selection decoders namely a row decoder Dx and a column decoder DY by way of correponding selection lines $x1 \ldots xI \ldots xm$; $y1 \ldots yj \ldots yn$.

As may be seen from FIG. 1, it is assumed that the two selection decoders DX, Dy of respective input registers Reg X, Reg Y are respectively chargeable by a crosspoint row or, respectively, crosspoint column address shared by a matrix lines (row or column) of crosspoints, in response to which they output a respective "1" selection signal to the selection line corresponding to the respective crosspoint line address. The coincidence of a row selection signal "1" and of a column selection signal "1" at the intersection of the appertaining matrix row with the appertaining matrix column in the set-up of a corresponding connection then causes an motivation of the holding memory cell located thereat, for example, the holding memory cell $Hij$, with the result that the switch, the switch $Kij$ in the present example, controlled by the holding memory cell $Hij$ becomes conductive. So that the switch $Kij$ considered in the present example becomes inhibited in a clear-down operation of the appertaining connection, the selection decoder DX of the register Reg X is, in turn, charged with the appertaining row address, so that the row decoder DX again outputs a row selection signal "1" onto its output line xi and, simultaneously, the column decoder DY is charged proceeding from its input register Reg Y with, for example, a blank address or with the address of a column of unconnected crosspoints, so that it outputs a column selection signal "1" onto its output line yj; the coincidence of a row selection signal "1" and a column selection signal "0" then causes the resetting of the holding memory cell Hij, with the result that the switch Kij it controls is inhibited.

Figure 2:
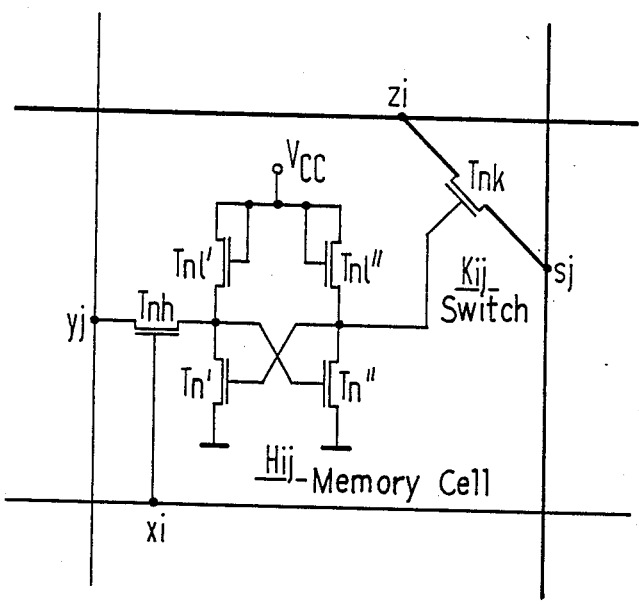
FIG. 2 is a schematic circuit diagram of a crosspoint of the switching arrangement of FIG. 1.

As may be seen from FIG. 2, the memory cell Hij selected in two coordinates by the two selection decoders (row decoder DX and column decoder DY of FIG. 1) can be formed by an n-channel transistor tnh and by two cross-coupled inverter circuits Tn', Tnl'; Tn", Tnl" of which one (Tn', tnl') has its inputs connected to the appertaining decoder output yj of the one selection decoder DY of FIG. 1 by way of the n-channel transistor Thn which, in turn, has its control electrode charged with the output signal of the appertaining decoder output xi of the other selection decoder Dx of FIG. 1, and has its output side connected to the control input of the switch Kij.

The switch Kij, for example, can be formed with a tristate driver or, as likewise illustrated in FIG. 2, by a single n-channel transistor Tnk which has its gate electrode charged with a forward potential ("H" level) exceeding the upper limit value of a signal to be through-connected between a column line (input line) sj and a row line (output line) zi by more than the transistor pinch-off voltage or, respectively, has its gate electrode charged with an inhibit voltage ("L" level) which falls below the level established by increasing the lower limit value of the signal to be through-connected between a column line (input line) sj and a row line (output line) zi by the transistor pinch-off voltage.

The n-channel transistor switch Kij is closed (rendered conductive) in that the "H" control potential (circuit-switching potential) is applied to the gate electrode of the n-channel transistor Tnk from the holding memory cell Hij this H control potential exceeding the upper limit value of the signal to be through-connected by more than the transistor pinch-off voltage of, for example, about 0.7 V; the n-channel transistor switch Kij is opened (rendered non-conductive) in that the "L" control potential (the inhibit potential) is applied to the gate electrode of the n-channel transistor Tnk, this "L" control potential falling below a level lying above the lower limit value of a signal to be through-connected by the transistor pinch off voltage of about 0.7 V. In order to avoid undesirable intermediate states, the specified limits of potential should be noticeably upwardly or downwardly transgressed. When, therefore, for example, the level of the signal to be through-connected between the input lines ej and the output lines ai comprise the limit values 0V and 3V, then the n-channel transistor Tnk can be advantageously inhibited with an inhibit potential of 0V and can be through-connected with a circuit switching potential of 4.2V.

For closing an n-channel transistor switch Kij, the holding memory cell Hij is charged via the row selection line xi with a "1" selection signal ("H" selection signal), rendering the n-channel transistor Tnh conductive and is charged via the column selection line yj with a "1" selection signal ("L" selection signal). The result thereof is that the transistor Tn" in the two-coupled inverter circuits proceeds into its inhibited condition and the transistor Tn' becomes conductive so that the inverter feed potential $V_{cc}$ of, for example, 4.5V takes effect at the gate electrode of the n-channel transistor Tnk via the resistor R and the n-channel transistor Tnk becomes conductive.

Figure 3:
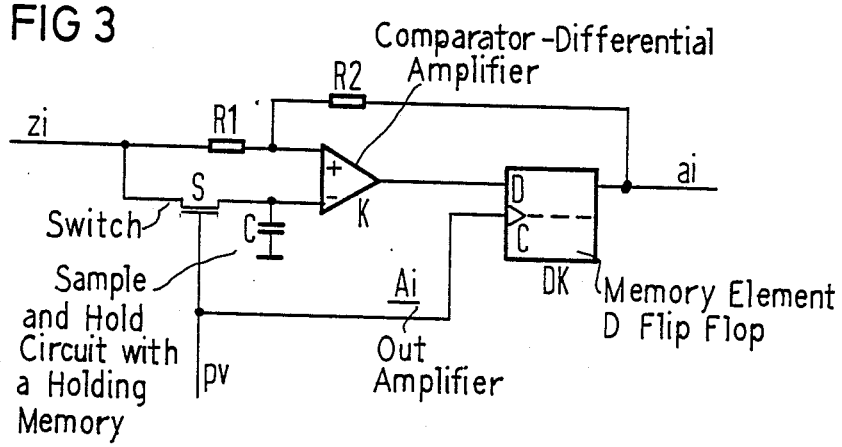
FIG. 3 is a schematic circuit diagram of structures setting forth the present invention.

The holding memory cell Hij of FIG. 2 is constructed in CMOS technology, the transistor Tp" being thereby constantly in its condition at high conductivity, whereas the load resistor Tnl" in the holding memory cell Hij of FIG. 3 excuted in N-MOS technology exhibits a low resistance only as long as the gate source voltage effective is greater than the transistor pinch-off voltage, this having a corresponding effect on the signal through-connection between the inputs line ej and the output lines ai.

When through-connecting a useful signal exhibiting its lower limit value, the gate terminal of the n-channel transistor Tnk is first charged via the transistor $T_p$ (FIG. 2) to a potential corresponding to the difference between the inverter feed potential $V_{CC}$ and the transistor pinch-off voltage. When the signal to be through-connected between the input linne ej and the output line ai subsequently switches to its upper limit value, i.e. when a positive signal edge occurs on the output line ej, then the same is switched over via the gate-source capacitance of the n-channel transistor Tnk to the gate terminal thereof, whereby the output capacitance of the holding memory cell Hij causes a capacitance voltage division. As a consequence of the constantly-low resistance of the transistor $T_{p''}$, given a holding memory cell of FIG. 2 constructed in CMOS technology, however, the gate potential of the n-channel transistor Tnk thereby remains essentially unaltered with the result that the useful signal level on the output line ai rises until the gate-source voltage below the transistor pinch-off voltage. In order to be able to through-connect a signal with a full signal boost, therefore, a somewhat higher inverter feed potential $V_{CC}$ must therefore be provided under given conditions for the holding memory cell Hij of FIG. 2.

In a manner corresponding to the producure set forth below, the remaining switch elements of the appertaining crosspoint row are inhibited simultaneously with the closing of the n-channel transistor switch Kij.

For opening the n-channel transistor Kij, the holding memory cell Hij is again charged via the row selection line xi with a "1" selection signal, the "H" selection signal, enabling the n-channel transistor Tnh, but is now charged with a "0" level, the selection signal "H", via the column selection line yj, with the result that the transistor Tn" is now driven into its conductive condition via the n-channel transistor Tnh, whereby the transistor Tn' is placed into its inhibited condition. In the exemplary embodiment of FIG. 2, the ground potential is then trhough connected to the gate electrode of the n-channel trasistor Tnk via the conductive transistor Tn" so that it become non-conductive, and therefore, the switch element Kij is blocked.

For testing purposes, it is advantageous to also be able to read out the respective through-connection condition of the crosspoint matrix. For this purpose, the respective inverter circuits (Tn', Tp' in FIg. 2) in the individual memory cells Hij in FIG. 2 can be connected to tristate-capable decoder outputs yj via respective appertaining n-channel transistor Tnh. Indicated in this respective FIG. 1 is that the signal outputs of the column decoder DY are followed by write switches WR which are assumed to be closed only given the appearnce of a write instruction on an enable line wr and then through-connect the "1" selection signal ("L") potentially appearing at a decoder output and the "0" selection signal ("H") appearing at the remaining decoder outputs to the individual column selection lines yl ... yj ... yn in a low resistance manner, so that the selected switch elements proceed into their through-connected or, respectively, inhibited conditions in the manner set forth above. When, by contrast, the switch state of a row of cross-points of the crosspoint matrix is merely to be read, for which purpose the appertaining row selection line, for example the selection line xi, is again charged with a "1" selection signal ("H") as in a connection set-up or clear-down, then the write switch WR remain open as a consequence of the lack of a write instruction on the enable line wr, with a result that the column selection line yl ... yj ... yn do not receive any control potential from the column decoder DY. By way of the n-channel transistor Tnh (FIGS. 2 and 3) of the holding memory cells (Hij) of the appertaining crosspoint row .. KPij .. of FIG. 1 which are nonetheless unlocked by the row selection signal "H" effective at the gate electrode, the signal state respective prevailing at the gate electrode of the transistor Tn"(FIGS. 2 and 3) is then through-connected to the respective column selection line (yj in FIGS. 2 and 3) whereby, given faultless operation, a "L" potential can occur on not more than one column selection line yl ... yj ... yn (in FIG. 1). As likewise indicated in FIG. 1, the address of this column sleection line, and therefore, the address of the appertaining crosspoint can be acquired with the assistance of an encoder CZ and can be forwarded to a following register Reg Z.

In order to oppose an undesirable setting or resetting of holding memory cells upon activation of the respective row selection line in such a reading of the through-connection state of crosspoint rows, the gate electrodes of the n-channel transistors Tnh in FIG. 2 advantageously connected to decoder outputs xl ... xi ... xm affected by a time constant so that the respective line is slowly activated. As likewise indicated in FIG. 1, a series resistor can be respectively inserted into the row selection line xl ... xi ... xm for this purpose or the decoder output itself can be provided with a high internal resistance. In both instances, a low-pass effect occurs in conjunction with the line capacitance so that the activation of the row selection lines experiences a corresponding retradation.

As already set forth above, the column decoder DY can potentially be charged with a dummy address or with the address of a column of crosspoints unconnected at their input side, being charged therewith proceeding from its input register Reg Y in order to therefore enable the resetting of holding memory cells Hij of a crosspoint row. In this regard, it should be added here that, without being shown in detail in FIG. 1, the n-channel transistors Tnk of FIG. 2 of such a column of switch elements Kij of FIG. 1 "unconnected" at their input side, can also have their main electrode at the side of the input line lying at a source of defined potential, for example grouind. This results in that those respective output lines ai to which no useful signal connection is through-connected lie at a defined level that may also be externally influenced for testing purposes.

In conclusion, it should also be noted that the crosspoint matrix can also be provided with expansion inputs to which corresponding outputs of a corresponding, other crosspoint matrices of the broadband signal space crosspoint device can be connected. Such expansion inputs can be formed by the inputs ej of the switch elements Kij of a column of crosspoints KPij whereby, in a departure from the circuit illustrated in FIG. 1, the individual switch element inputs ej of this column are not connected parallel to one another but form, respectively, individual expansion inputs of the crosspoint matrix.

The only thing essential is that the forward resistance of such a switch be high in comparison to the internal resistance of the input driver Ej (FIG. 1) provided at the matrix column line sj which is effective at the matrix column line sj, this being capable of being easily realized by an appropriate design of the transistor geometry.

It is also shown in FIG. 1 that the outputs of the column decoder DY are followed by write switches WR which may only be closed given the occurrence of a write instruction on an enable line wr and through-connect the "1" selection signal ("L") potentially appearing at a decoder output and the "0" selection signals ("H") appearing at the remaining decoder outputs to the individual column selection lines yl ... yj ... yn in a low-resistance manner, so that the switches respectively selected in the manner set forth above proceed into their transmissive or, respectively, inhibited condition.

When, by contrast, the switch state of a row of crosspoints of the crosspoint matrix is to only be read, to which end the appertaining row selection line such as the line xi, is again charged with a "1" selection signal ("H") as in a call set-up or call clear-down, then, as the result of the lack of a write instructiton appearing on the enable line wr, the write switches wr remain open with the result that the column selection lines yl ... yi ... yn do not receive any control potential proceeding from the column decoder DY. By way of the n-channel transistors Tnh (FIG. 2) in the holding memory cell Hij of the appertaining crosspoint row KPij, the n-channel transistor Tnh being nonetheless unlocked by the row selection signal "H" to the gate electrode, a signal state then just prevailing in the holding memeory cell Hij can be connected through to the respective column selection line (yj in FIG. 2), whereby a "L" potential must not appear on more than one column selection line yl . . .. yj ... yn (FIG. 1) given faultless operation. As likewise indicated in FIG. 1, the address of the column selection line and, therefore, the address of the appertaining crosspoint can be acquired with the assistance of an encoder CZ and can be forwarded from the encoder to the following register Reg Z.

As likewise illustrated in FIG. 3. the output amplifier Ai (FIG. 1) provided between a row line zi (FIGS. 1 and 2) and the following output ai (FIG. 1) of the crosspoint matrix then comprises a cascade circuit (chain circuit) inserted into the appertaining output line section zi and ai, the cascade circuit comprising a comparator K (realized with a differential amplifier in FIG. 3) and a memory element (formed with an edge-controlled D flip-flop DK in the exemplary embodiment of FIG. 3), as well as a sample-and-hold circuit with a holding memory C formed by a capacitor in FIG. 3 and a switch formed by an MOS transistor S in FIG. 3 which connects the output line section zi leading from the appertaining switch Kij (in FIGS. 1 and 2) to the one comparator input (+) to the other comparator input (−). The forward resistance of the transistor can thereby be low in comparison to the forward resistance of a switch Kij (FIGS. 1 and 2). Together with a clock input C of the D flip-flop Dk, the control electrode of the switching transistor S is connected to a clock line pv which is assumed to be charged with a clock subdividing a bit switching time interval into a preliminary phase and into a main phase.

The switch transistor S is transmissive during the preliminary phase, so that the holding memory C is charged to the potential momentarily prevailing at the matrix row line zi. The input drive Ej (FIG. 1) can be switched into a quiescent condition (tristate) in this preliminary phase or can already build up the potential corresponding to the bit to be switched, building the potential up proceeding from its output.

In the following main phase, in which the switching transistor S is inhibited, the potential retained in the holding member C is maintained at the comparator input (−), whereas simultaneously the matrix row line zi connected to the other input (+) of the comparator K is (further) charged to the potential corresponding to the bit through-connected therewith, being charged by way of the switch Kij (FIGS. 1 and 2) proceeding from the appertaining column line sj (FIGS. 1 and 2). A slight reloading of the matrix row line zi then already suffices in order to potentially effect an unambiguous change of the digital signal from the one signal state to the signal state at the comparator output (the input D of the D flip-flop DK), this signal state then being transferred at the end of the through-connection phase with the clock edge from the D flip-flop DK and being therefore established at the output Ai of the switching equipment. As already stated, the switch Kij (FIGS. 1 and 2) can therefore be designed in view of a relatively high forward resistance.

As likewise already set forth above, the comparator K is advantageously hysteresis affected, this being achieved in the exemplary embodiment of FIG. 3 with the assistance of a positive feedback circuit, comprising two resistors R1 and R2. With such a hysteresis effect, the comparator K guarantees a faultless digital signal through-connection even when extremely long trains identical bits appear in the digital signal, so that the potential on the output line section zi in time reaches the full signal level corresponding to this bit and no difference in potential then remains between the two comparator inputs, as had been present up to that time, even given a succession of identical signal bits.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A broadband signal switching apparatus, comprising:
    a crosspoint matrix constructed in field effect trasistor technology devices and including a plurality of input lines and a plurality of output lines intersecting said input lines and forming crosspoints;
    a plurality of output amplifiers each connected to a respective output line;
    each said crosspoints comprising switch elements having a high forward resistance in the through connected condition compared to the internal resistance effective at the respective matrix input line; and
    wherein each of said output amplifiers comprises a circuit including a comparator having a first comparator input which is connected to the respective output line and having a second comparator input, a sample-and-hold circuit including a holding memory which is connected to said second input of said comparator, said sample-and-hold circuit further including a switch which connects said second input of said comparator and said holding memory to the respective output line and having a control electrode which receives clock pulses which are subdividing a bit switching time interval into a preliminary phase and an actual switching phase and by way of which said holding memory is reloaded through said switch of said sample-and-hold circuit during every preliminary phase at least approximately to the potential momentarily prevailing on the respective output line, and maintaining such potential at said second input of said comparator during the following switch phase, said comparator further having an output; and
    a memory element which receives an input from said comparator and also receives the clock pulses which are supplied to said switch of said sampler-and-hold circuit and said memory element having an output which is the output of the respective amplifier.

2. The broadband switching apparatus of claim 1, wherein:
    said comparator has a hysteresis effect.

3. The broadband switching aapparatus of claim 1, wherein said memory element comprises:
    a D flip-flop.

* * * * *